United States Patent
Takashima et al.

[11] Patent Number: 5,942,051
[45] Date of Patent: Aug. 24, 1999

[54] NON-ORIENTED ELECTROMAGNETIC STEEL SHEET WITH LOW IRON LOSS AFTER STRESS RELIEF ANNEALING, AND CORE OF MOTOR OR TRANSFORMER

[75] Inventors: Minoru Takashima; Keiji Sato; Takashi Obara, all of Okayama, Japan

[73] Assignee: Kawasaki Steel Corporation, Japan

[21] Appl. No.: 08/938,544

[22] Filed: Sep. 26, 1997

Related U.S. Application Data

[62] Division of application No. 08/423,356, Apr. 18, 1995, Pat. No. 5,730,810.

[30] Foreign Application Priority Data

Apr. 22, 1994 [JP] Japan ................................. 6-084708

[51] Int. Cl.$^6$ .................................................. H01F 1/147
[52] U.S. Cl. ............................ 148/111; 29/602.1; 29/609; 29/596
[58] Field of Search ................... 148/111; 29/602.1, 29/606, 609, 596, 592.1

[56] References Cited

U.S. PATENT DOCUMENTS

| | | | |
|---|---|---|---|
| 3,960,616 | 6/1976 | Evans et al. | 148/112 |
| 4,204,890 | 5/1980 | Irie et al. | 148/307 |
| 4,338,143 | 7/1982 | Shimoyama et al. | 148/307 |

*Primary Examiner*—John Sheehan
*Attorney, Agent, or Firm*—Austin R. Miller

[57] ABSTRACT

In a non-oriented electromagnetic steel sheet including about 0.01 wt % or less of C, about 1.0 wt % or less of Si, Mn in a range of about 0.1 wt % to 1.5 wt %, Al in a range of about 0.2 wt % to 1.5 wt %; the steel sheet having a critical amount of about 2 to 80 ppm rare earth metal, and the quantities of Ti and Zr in the steel sheet being limited to about 15 ppm or less of Ti, and about 80 ppm or less of Zr. The sheet exhibits excellent magnetic characteristics, such as iron loss, even when punched and laminated sheets are stress relief annealed at a low temperature for a short period of time.

8 Claims, 3 Drawing Sheets

NON-ORIENTED ELECTROMAGNETIC STEEL SHEET WITH LOW IRON LOSS AFTER STRESS RELIEF ANNEALING, AND CORE OF MOTOR OR TRANSFORMER

This application is a divisional of application Ser. No. 08/423,356, filed Apr. 18, 1995 now U.S. Pat. No. 5,730,810.

FIELD OF THE INVENTION

The present invention relates to a non-oriented electromagnetic steel sheet which contains Si in an amount not greater than about 1.0% and has excellent magnetic characteristics.

More particularly, the invention remarkably improves (reduces) iron loss when punched sheets are subject to stress relief annealing, even when the annealing is conducted at a low temperature for a short time.

Due to their modest cost, non-oriented electromagnetic steel sheets containing Si in an amount not greater than about 1.0% are widely used as cores of small-sized motors or transformers. Recently, greater emphasis has been placed on the energy efficiency of electric equipment in the interest of reduced energy consumption. To improve the energy efficiency of motors or transformers, the iron loss, which accounts for a large part of energy losses, must be reduced. Consequently, demand has increased for low iron loss non-oriented electromagnetic steel sheets used as motor or transformer cores.

Such cores are manufactured by (1) punching a non-oriented electromagnetic steel sheet, (2) laminating the punched sheets, and (3) annealing the laminated sheets to relieve stress. Step (3) (stress relief annealing) is performed to relieve stress introduced into the sheet by punching, thereby decreasing dislocations. Stress relief annealing also reduces iron loss by promoting crystal grain growth.

To lower production costs, manufacturers have been decreasing the temperature and shortening the period of time for stress relief annealing after the punching and laminating steps (e.g., by changing annealing conditions from 750° C.×2 hours to 725° C. ×1 hour).

Therefore, an object of the invention is to provide a non-oriented electromagnetic steel sheet which has remarkably improved iron loss when punched and laminated sheets are subject to stress relief annealing, even when the annealing is conducted at a low temperature for a short time.

DESCRIPTION OF THE RELATED ART

Japanese patent laid-open No. 3-215627 and No. 52-2824 disclose methods of adding REM (rare earth metal) to reduce the iron loss of non-oriented electromagnetic steel sheets containing not more than 1.0% Si. The disclosed methods seek to reduce iron loss by decreasing the amount of small precipitates (comprised mainly of sulfides), and by promoting grain growth during finish annealing and stress relief annealing.

When the above-described methods were conducted with stress relief annealing at a low temperature for a short time, grain growth was impeded and low iron loss (e.g., W15/50≦4.0 W/Kg) could not be achieved. In those methods, Zr and Ti remain in quantities of about 100 ppm and 30 ppm, respectively.

SUMMARY OF THE INVENTION

The inventors have discovered that in prior art methods, very small precipitates impede the growth of crystal grains during the process of stress relief annealing, thus preventing the achievement of low iron loss. We have discovered that reducing the quantities of Zr and Ti surprisingly decreases the amount of small precipitates produced. That finding, combined with a discovery of the critical amount of REM to be added, constitutes the basis of the invention.

Specifically, the invention provides a non-oriented electromagnetic steel sheet which contains REM in a range from about 2 ppm to 80 ppm and not more than about 15 ppm Ti and not more than about 80 ppm Zr. The sheet exhibits improved iron loss even after stress relief annealing is conducted at a low temperature for a short time.

Other features of the invention will be apparent from the claims and the detailed description of the invention provided below.

DETAILED DESCRIPTION OF THE INVENTION

The invention will be described below in detail hereinafter, with preliminary reference to experimental examples.

(1) Examples Indicating Effects of Zr and REM on Iron Loss After Los-Temperature, Short-Time Stress Relief Annealing Steels with REM of 20 ppm and steels without REM, all containing 0.5% of Si, 0.3% of Al, 0.55% of Mn, 5 ppm of Ti, and various contents of Zr were subject to hot rolling, cold rolling, and then finish annealing at 780° C.×30 seconds, thereby producing product sheets. Each of the product sheets was shorn into pieces of Epstein size (280×30 mm), and stress relief annealing at 725° C.×1 hour was performed on the sheet pieces to relieve stress introduced in the shearing step. Magnetic characteristics of the annealed sheet pieces were measured, and the results are shown in FIG. 1.

Figure 1:
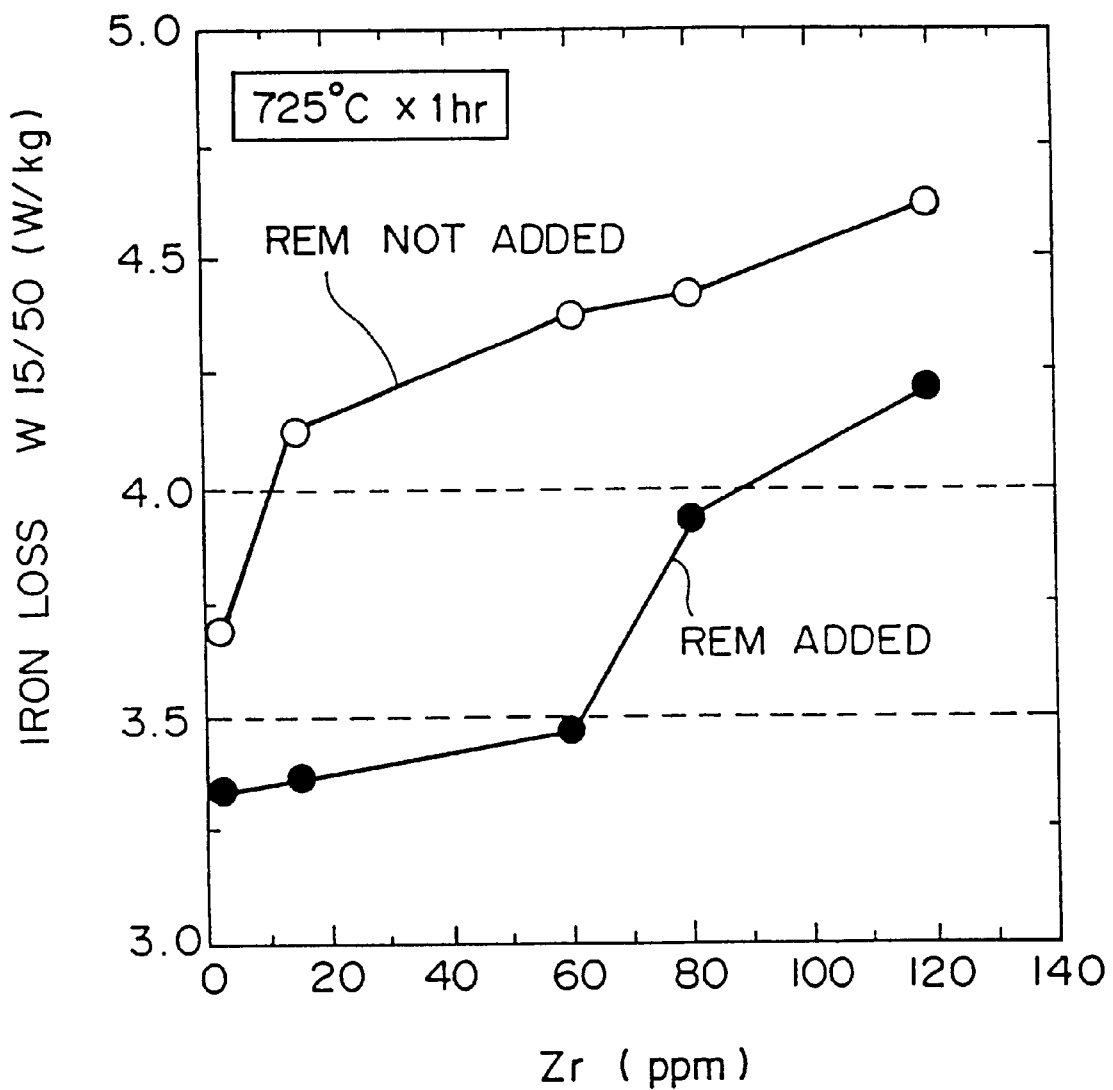
FIG. 1 is a graph showing the effects of Zr and REM on iron loss (W15/50) after stress relief annealing of 725° C.×1 hour.

As FIG. 1 reveals, iron loss can be decreased by reducing the content of Zr even when no REM is added. However, the effect is improved by adding REM and controlling Zr content to be about 80 ppm or less, thereby achieving an iron loss (W15/50) of about 4.0 W/kg or less. Particularly, by controlling Zr content about 60 ppm or less, an even better iron loss (W15/50) of about 3.5 W/kg or less can be obtained. Zr content should therefore not exceed about 80 ppm, and preferably is not larger than about 60 ppm.

(2) Examples Illustrating Effects of Ti and REM on Iron Loss After Low-Temperature, Short-Time Stress Relief Annealing Steels with REM of 20 ppm and steels without REM, all containing 0.5% of Si, 0.3% of Al, 0.55% of Mn, 5 ppm of Zr, and various contents of Ti were subject to hot rolling, cold rolling, and then finish annealing of 780° C.×30 seconds, thereby producing product sheets. Each of the product sheets was shorn into pieces of Epstein size (280×30 mm), and stress relief annealing at 725° C.×1 hour was performed on the sheet pieces to relieve stress introduced in the shearing step. Magnetic characteristics of the annealed sheet pieces were measured, and the results are shown in FIG. 2.

Figure 2:
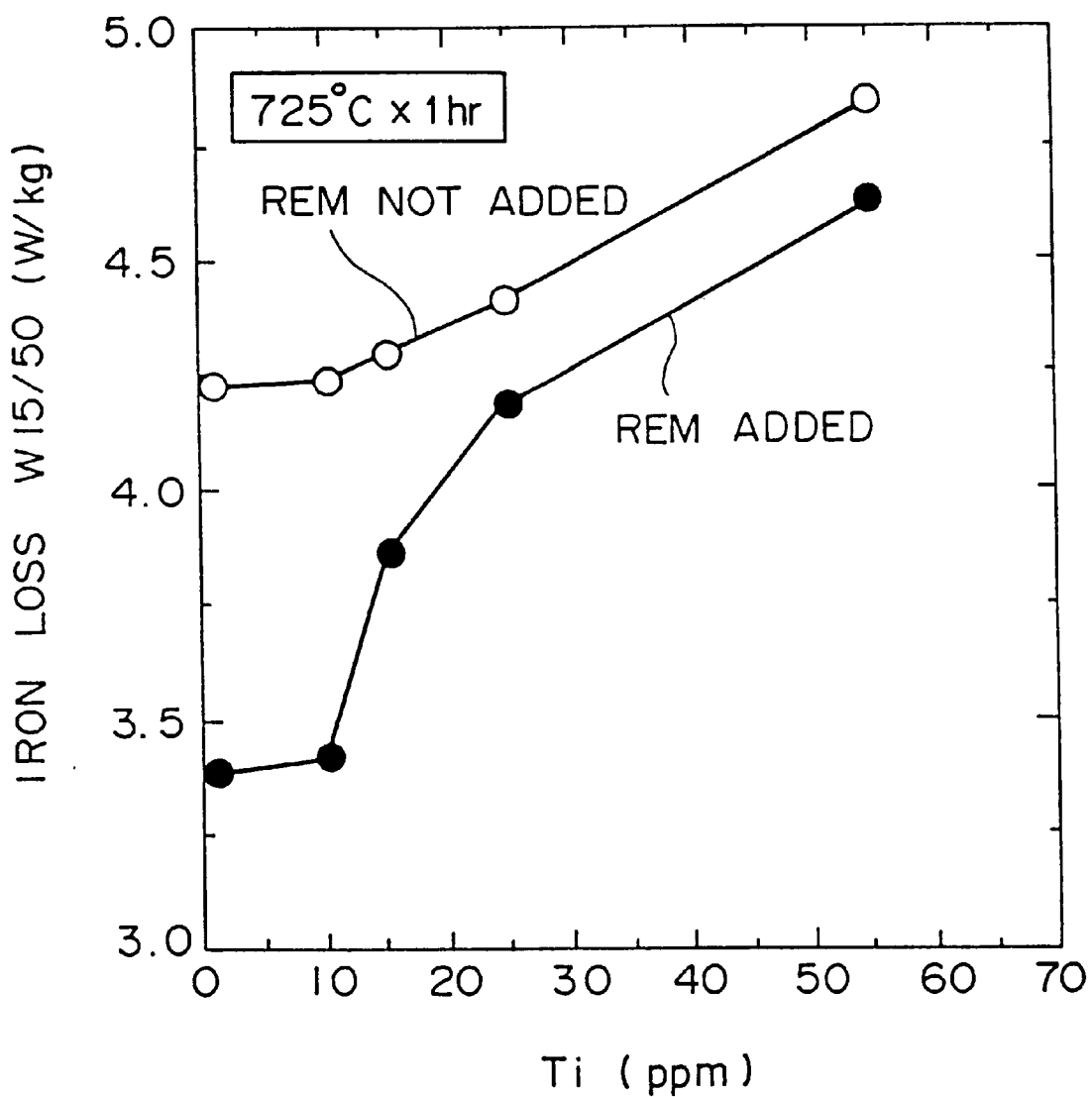
FIG. 2 is a graph showing the effects of Ti and REM on iron loss (W15/50) after stress relief annealing of 725° C.×1 hour.

As FIG. 2 reveals, iron loss can be lowered by reducing the content of Ti even when no REM is added. However, the effect is enhanced by adding REM and controlling Ti content to about 15 ppm or less, thereby achieving an iron loss (W15/50) of about 4.0 W/kg or less. Particularly, by controlling Ti content to about 10 ppm or less, an even better iron loss (W15/50) of about 3.5 W/kg or less can be obtained. Ti content should therefore not exceed about 15 ppm, and preferably is not larger than about 10 ppm.

(3) Examples Illustrating Effects of REM upon Iron Loss After Low-Temperature, Short-Time Stress Relief Annealing Steels containing 0.5% of Si, 0.3% of Al, 0.55% of Mn, 5 ppm of Ti, 40 ppm of Zr, and REM of various contents were subject to hot rolling, cold rolling, and then finish annealing of 780° C.×30 seconds, thereby producing product sheets. The crystal grain size of the product sheets ranged from 23 to 26 μm. Each of the product sheets was shorn into pieces of Epstein size (280×30 mm), and stress relief annealing at 725° C.×1 hour was performed on the sheet pieces to relieve stress introduced in the shearing step. Magnetic characteristics of the annealed sheet pieces were measured, and the results are shown in FIG. 3.

Figure 3:
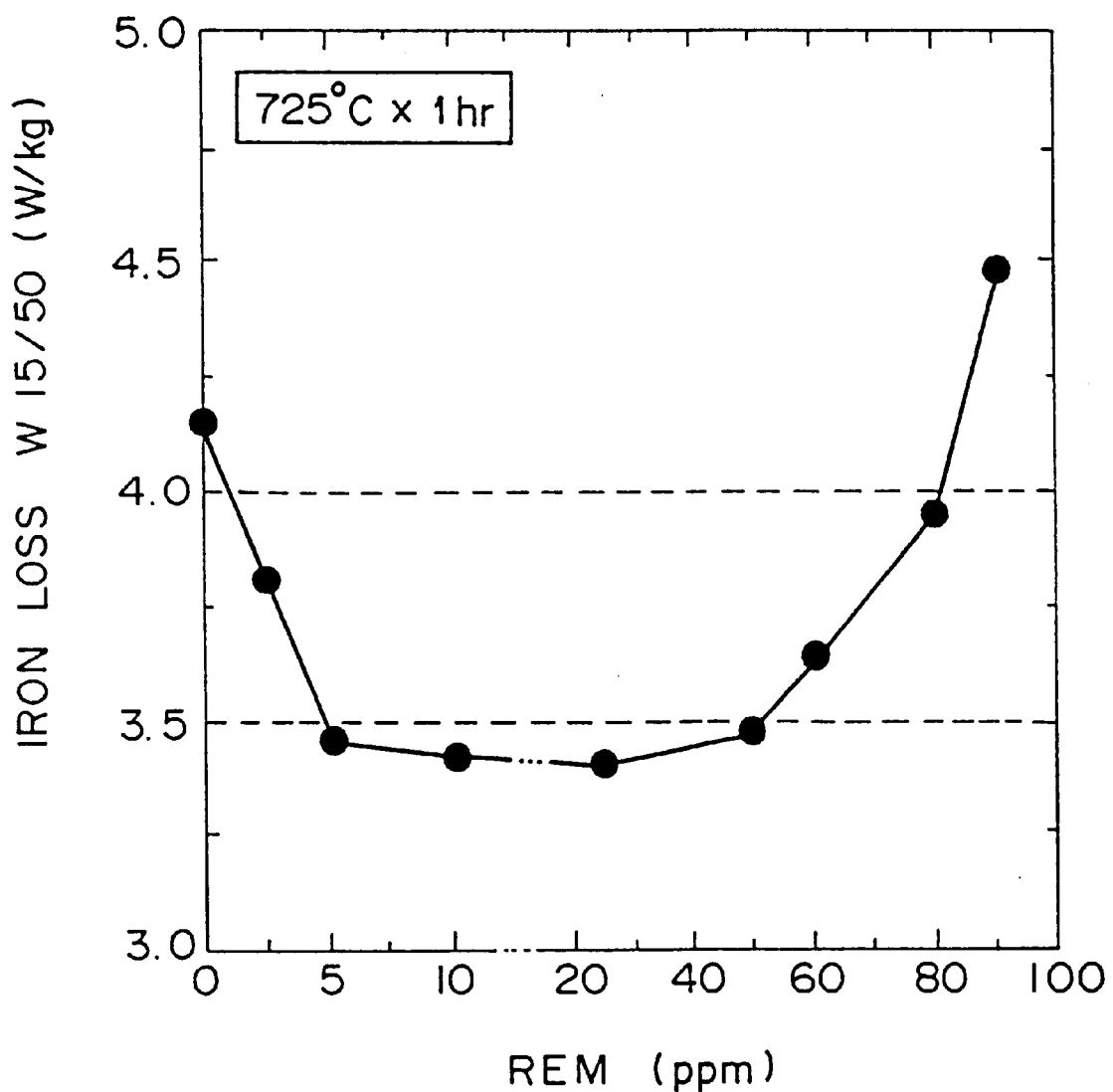
FIG. 3 is a graph showing the effect of REM on iron loss (W15/50) after stress relief annealing of 725° C.×1 hour.

As revealed in FIG. 3, the iron loss cannot be satisfactorily lowered if the content of REM is out of the proper range. By controlling the REM content to a range of about 2 to 80 ppm, an iron loss (W15/50) of about 4.0 W/kg or less can be obtained. By controlling the REM content to a range of about 5 to 50 ppm, an even better iron loss (W15/50) of about 3.5 W/kg or less can be obtained. REM content should therefore fall within the range of about 2 to 80 ppm, and preferably about 5 to 50 ppm.

(4) Mechanism of the Invention

Although various complex mechanisms may be involved in achieving the remarkable results of this invention, it is believed that with no REM added, even if the content of Zr and Ti is reduced to about Zr≦80 ppm and Ti≦15 ppm, significant quantities of the remaining Zr and Ti are precipitated as very small particles as nitrides. The very small precipitates are believed to be easily solid-solved under the ambient conditions of stress relief annealing, with the result that crystal grain growth is not impeded.

Conversely, when the annealing is conducted at a low temperature for a short time, it is believed that very small precipitates are neither solid-solved nor mobilized, and that a great amount of the small precipitates is dispersed, thereby impeding crystal grain growth. However, when REM is added in a critical amount, it has been discovered that the nitrides are precipitated on REM sulfides. These composite precipitates are so coarse that they are believed to be not able to disperse in great quantities and hence do not impede crystal grain growth.

We have found that, if the REM content is too small, the effect of the coarse precipitates would be insufficient. If it is too large, REM itself would deteriorate the iron loss. Consequently, REM content is preferably within the range as described above.

(5) Other Components

Si is an element useful for reducing iron loss because it increases the specific resistance of the steel. However, if Si content exceeds about 1.0%, the addition of Si would increase production costs and also deteriorate the magnetic density.

Mn is a useful element because it fixes and renders harmless S, which would otherwise harm the magnetic characteristics. Therefore, Mn is contained in amount not less than about 0.1%, preferably not less than about 0.5%. However, since Mn can deteriorate the magnetic density, the Mn content should not be larger than about 1.5%, preferably not larger than about 1.0%.

Al is a useful element because it fixes and renders harmless O, which would otherwise harm the magnetic characteristics. If Al content is less than about 0.2%, fine AlN would be created and impede the grain growth. On the other hand, the addition of Al in excess of about 1.5% would push up the production cost and also deteriorate the magnetic density.

Additionally, surface hardness, an important parameter regarding punching, is controlled by adjusting the quantities of Si, Mn and Al added.

C content is preferably not larger than about 0.01% because it deteriorates the magnetic characteristics of the steel when precipitated.

(6) Production Method for Non-oriented Electromagnetic Steel Sheet of the Invention The production method for the non-oriented electromagnetic steel sheet of the invention is not especially limited. One preferable manufacturing method is as follows.

An ingot steel is prepared by a conventional steel-making process utilizing a converter and degassing. REM is added during the degassing step. Ti and Zr are reduced by controlling the processing times, temperatures and basicity set for the converter and the degassing.

The resulting ingot steel is transformed into a slab through a continuous casting process or a casting-ingotting process. The resulting slab is transformed into a not-rolled sheet by hot rolling. This step can be accomplished by directly hot-rolling the slab or by hot-rolling the slab after re-heating. The hot-rolled sheet may be subjected to, if necessary, box annealing, continuous annealing, or self-annealing by coiling the sheet under high temperature immediately after the hot rolling. These annealing processes are performed as required, depending on the target magnetic density.

The resulting hot-rolled sheet is transformed into a cold-rolled sheet of product thickness by cold rolling. This step can be accomplished by cold-rolling the sheet directly to the product thickness, or by first cold-rolling the sheet to an intermediate thickness and, after annealing, cold-rolling the sheet again to the product thickness.

The resulting cold-rolled sheet is subjected to finish annealing to obtain a product sheet. The finish annealing can be performed by an conventional method. If the crystal grain size of the product is too large, insufficient surface hardness results, causing a remarkable deterioration in punching accuracy. Therefore, the annealing temperature and the annealing time are adjusted so that the crystal grain size is less than about 40 μm, preferably in the range of about 10 to 30 μm.

Additionally, an insulating coating may be applied over the sheet surface.

EXAMPLES

The invention will now be described through illustrative Examples. The Examples are not intended to limit the scope of the invention defined in the appended claims.

Example 1

After a conventional steel-making process utilizing a converter and degassing, slabs having the compositions shown in Table 1 were prepared by continuous casting of ingots. Each resulting slab was subjected to hot rolling without being cooled, thereby producing a hot-rolled sheet. Annealing at 960° C.×2 minutes was performed on the hot-rolled sheet. The annealed sheet was subject to pickling and then cold rolling to a sheet thickness of 0.5 mm. Finish annealing at 800° C.×15 seconds was performed on the cold-rolled sheet, and an insulating coating was applied, thereby yielding a product sheet. The crystal grain size of the product sheet was not larger than 35 μm. The product sheet was shorn into pieces of Epstein size, and stress relief annealing at 725° C.×1 hour was performed on the sheet pieces in a nitrogen atmosphere to relieve stress. Magnetic characteristics were then measured, and the results of the measurement are listed in Table 1.

Samples No. 1, 2, 3 and 4, which are within the scope of the invention, exhibited low iron loss. In particular, Sample No. 1 exhibited especially low iron loss.

TABLE 1

| Sample No. | C (wt %) | Si (wt %) | Mn (wt %) | Ti (wt ppm) | Zr (wt ppm) | Al (wt %) | REM (wt ppm) | $B_{50}$ (T) | $W_{15/50}$ (W/kg) | Remarks |
|---|---|---|---|---|---|---|---|---|---|---|
| 1 | 0.0038 | 0.58 | 0.35 | 8 | 45 | 0.60 | 20 | 1.78 | 3.20 | Inventive Example |
| 2 | 0.0025 | 0.58 | 0.35 | 7 | 45 | 0.62 | 4 | 1.78 | 3.55 | Inventive Example |
| 3 | 0.0032 | 0.57 | 0.35 | 7 | 50 | 0.65 | 55 | 1.76 | 3.62 | Inventive Example |
| 4 | 0.0024 | 0.58 | 0.34 | 13 | 35 | 0.65 | 24 | 1.72 | 3.74 | Inventive Example |
| 5 | 0.0022 | 0.58 | 1.78 * | 8 | 50 | 0.65 | 24 | 1.70 | 4.12 * | Comparative Example |
| 6 | 0.0025 | 0.62 | 0.08 * | 6 | 40 | 0.65 | 22 | 1.72 | 4.85 * | Comparative Example |
| 7 | 0.0034 | 0.60 | 0.35 | 8 | 35 | 1.65 * | 22 | 1.70 | 4.35 * | Comparative Example |
| 8 | 0.0038 | 0.57 | 0.34 | 7 | 30 | 0.18 * | 25 | 1.72 | 4.72 * | Comparative Example |
| 9 | 0.0025 | 0.57 | 0.36 | 6 | 35 | 0.66 | 1 * | 1.73 | 4.30 * | Comparative Example |
| 10 | 0.0045 | 0.59 | 0.35 | 7 | 35 | 0.66 | 90 * | 1.74 | 4.25 * | Comparative Example |
| 11 | 0.0035 | 0.57 | 0.35 | 18 * | 40 | 0.65 | 23 | 1.72 | 4.25 * | Comparative Example |
| 12 | 0.0045 | 0.62 | 0.35 | 7 | 105 * | 0.65 | 20 | 1.73 | 4.80 * | Comparative Example |
| 13 | 0.0120 | 0.59 | 0.36 | 7 | 40 | 0.66 | 22 | 1.72 | 4.44 * | Comparative Example |

*: Out of Claimed Range

Example 2

After a conventional steel-making process utilizing a converter and degassing, slabs having the compositions shown in Table 2 were prepared by continuous casting of ingots. Each slab was subjected to hot rolling after being re-heated, thereby producing a hot-rolled sheet. The hot-rolled sheet was subjected to pickling and then cold rolling to a sheet thickness of 0.5 mm. Finish annealing at 800° C.×15 seconds was performed on the cold-rolled sheet, and an insulating coating was applied, thereby yielding a product sheet. The crystal grain size of the product sheet was not larger than 35 μm. The product sheet was shorn into pieces of Epstein size, and stress relief annealing at 725° C.×1 hour was performed on the sheet pieces in a nitrogen atmosphere to relieve stress. Magnetic characteristics were then measured, and the results of the measurement are listed in Table 2.

Samples No. 1, 2, 3 and 4, which are within the scope of the invention, exhibited low iron loss. In particular, Sample No. 1 exhibited especially low iron loss.

What is claimed is:

1. A method of producing a motor core having low iron loss, which comprises:

providing a non-oriented electromagnetic steel sheet containing about 0.01 wt % or less of C, about 1.0% or less of Si, about 0.1 to 1.5 wt % of Mn, about 0.2 to 1.5 wt % of Al, said steel further comprising about 2 to 80 ppm rare earth metal, and zero to about 15 ppm or less of Ti, and zero to about 80 ppm or less of Zr, whereby said steel exhibits low iron loss after stress relief annealing at no higher than about 725° C. for no longer than about an hour;

punching said non-oriented electromagnetic steel sheet into the shape of a motor core;

laminating said punched sheets; and stress relief annealing said laminated sheets.

2. A method of producing a transformer core having low iron loss, which comprises:

providing a non-oriented electromagnetic steel sheet containing about 0.01 wt % or less of C, about 1.0 wt % or less of Si, about 0.1 to 1.5 wt % of Mn, about 0.2 to 1.5 wt % of Al, said steel further comprising about 2 to 80 ppm rare earth metal, and zero to about 15 ppm or less of Ti, and zero to about 80 ppm or less of Zr, whereby said steel exhibits low iron loss after stress relief annealing at no higher than about 725° C. for no longer than about an hour;

punching said non-oriented electromagnetic steel sheet into the shape of a transformer core;

laminating said punched sheet so produced; and

TABLE 2

| Sample No. | C (wt %) | Si (wt %) | Mn (wt %) | Ti (wt ppm) | Zr (wt ppm) | Al (wt %) | REM (wt ppm) | $B_{50}$ (T) | $W_{15/50}$ (W/kg) | Remarks |
|---|---|---|---|---|---|---|---|---|---|---|
| 1 | 0.0038 | 0.58 | 0.35 | 8 | 45 | 0.60 | 20 | 1.74 | 3.31 | Inventive Example |
| 2 | 0.0025 | 0.58 | 0.35 | 7 | 45 | 0.62 | 4 | 1.73 | 3.65 | Inventive Example |
| 3 | 0.0032 | 0.57 | 0.35 | 7 | 50 | 0.65 | 55 | 1.73 | 3.73 | Inventive Example |
| 4 | 0.0024 | 0.58 | 0.34 | 13 | 35 | 0.65 | 24 | 1.73 | 3.85 | Inventive Example |
| 5 | 0.0022 | 0.58 | 1.78 * | 8 | 50 | 0.65 | 24 | 1.68 | 4.21 * | Comparative Example |
| 6 | 0.0025 | 0.62 | 0.08 * | 6 | 40 | 0.65 | 22 | 1.70 | 4.95 * | Comparative Example |
| 7 | 0.0034 | 0.60 | 0.35 | 8 | 35 | 1.65 * | 22 | 1.67 | 4.45 * | Comparative Example |
| 8 | 0.0038 | 0.57 | 0.34 | 7 | 30 | 0.18 * | 25 | 1.70 | 4.95 * | Comparative Example |
| 9 | 0.0025 | 0.57 | 0.36 | 6 | 35 | 0.66 | 1 * | 1.71 | 4.40 * | Comparative Example |
| 10 | 0.0045 | 0.59 | 0.35 | 7 | 35 | 0.66 | 90 * | 1.70 | 4.32 * | Comparative Example |
| 11 | 0.0035 | 0.57 | 0.35 | 18 * | 40 | 0.65 | 23 | 1.71 | 4.31 * | Comparative Example |
| 12 | 0.0045 | 0.62 | 0.35 | 7 | 105 * | 0.65 | 20 | 1.72 | 4.85 * | Comparative Example |
| 13 | 0.0120 | 0.59 | 0.36 | 7 | 40 | 0.66 | 22 | 1.70 | 4.52 * | Comparative Example |

*: Out of Claimed Range stress relief annealing said laminated sheet.

3. A method of producing a motor core having low iron loss, which comprises:

providing a non-oriented electromagnetic steel sheet according to claim 1 whereby said steel exhibits low iron loss of about 4.0 W/kg or less as W15/50 after stress relief annealing at no higher than about 725° C. for no longer than about an hour;

punching said non-oriented electromagnetic steel sheet into the shape of a motor core;

laminating said punched sheets; and stress relief annealing said laminated sheets.

4. A method producing a transformer core having low iron loss, which comprises:

providing a non-oriented electromagnetic steel sheet according to claim 2, whereby said steel exhibits low iron loss of about 4.0 W/kg or less as W15/50 after stress relief annealing at no higher than about 725° C. for no longer than about an hour;

punching said non-oriented electromagnetic steel sheet into the shape of a transformer core;

laminating said punched sheets; and stress relief annealing said laminated sheets.

5. A method of producing a motor core having low iron loss, which comprises:

providing a non-oriented electromagnetic steel sheet according to claim 1, whereby said steel exhibits low iron loss of about 3.5 W/kg or less as W15/50 after stress relief annealing at no higher than about 725° C. for no longer than about an hour;

punching said non-oriented electromagnetic steel sheet into the shape of a motor core;

laminating said punched sheets; and stress relief annealing said laminated sheets.

6. A method of producing a transformer core having low iron loss, which comprises:

providing a non-oriented electromagnetic steel sheet according to claim 2, whereby said steel exhibits low iron loss of about 3.5 W/kg or less as W15/50 after stress relief annealing at no higher than about 725° C. for no longer than about an hour;

punching said non-oriented electromagnetic steel sheet into the shape of a transformer core;

laminating said punched sheets; and stress relief annealing said laminated sheets.

7. A method of producing a motor core having low iron loss, which comprises:

providing a non-oriented electromagnetic steel sheet according to claim 1, whereby said steel exhibits low iron loss after stress relief annealing at no higher than about 725° C. for no longer than about an hour;

punching said non-oriented electromagnetic steel sheet into the shape of a motor core;

stress relief annealing said punched sheets; and laminating said sheets.

8. A method of producing a transformer core having low iron loss, which comprises:

providing a non-oriented electromagnetic steel sheet according to claim 2, whereby said steel exhibits low iron loss after stress relief annealing at no higher than about 725° C. for no longer than about an hour;

punching said non-oriented electromagnetic steel sheet into the shape of a transformer core;

stress relief annealing said punched sheets; and laminating said sheets.

* * * * *

UNITED STATES PATENT AND TRADEMARK OFFICE
CERTIFICATE OF CORRECTION

PATENT NO. : 5,942,051
DATED : August 24, 1999
INVENTOR(S) : Takashima et al

It is certified that error appears in the above-identified patent and that said Letters Patent is hereby corrected as shown below:

In column 4 at approximately line 60, please change "960°" to --950° --.

Signed and Sealed this

Fifth Day of September, 2000

Attest:

Q. TODD DICKINSON

*Attesting Officer*

*Director of Patents and Trademarks*

UNITED STATES PATENT AND TRADEMARK OFFICE
CERTIFICATE OF CORRECTION

PATENT NO. : 5,942,051
DATED : August 24, 1999
INVENTOR(S) : Takashima et al

It is certified that error appears in the above-identified patent and that said Letters Patent is hereby corrected as shown below:

In column 4 at approximately line 60, please change "960°" to –950° -- .

Signed and Sealed this

Twenty-first Day of November, 2000

Attest:

Q. TODD DICKINSON

Attesting Officer

Director of Patents and Trademarks